United States Patent
Schiene et al.

(10) Patent No.: US 7,855,492 B2
(45) Date of Patent: Dec. 21, 2010

(54) LAMP HOLDER FOR A DIELECTRIC BARRIER DISCHARGE LAMP

(75) Inventors: Wolfgang Schiene, Wuerselen (DE); Georg Greuel, Roetgen (DE); Michael Schaaf, Herzogenrath (DE); Andreas Poque, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 649 days.

(21) Appl. No.: 11/816,533

(22) PCT Filed: Feb. 14, 2006

(86) PCT No.: PCT/IB2006/050479

§ 371 (c)(1), (2), (4) Date: Aug. 17, 2007

(87) PCT Pub. No.: WO2006/087675

PCT Pub. Date: Aug. 24, 2006

(65) Prior Publication Data

US 2008/0265775 A1 Oct. 30, 2008

(30) Foreign Application Priority Data

Feb. 21, 2005 (EP) .................................. 05101286

(51) Int. Cl.
*H01J 7/24* (2006.01)
(52) U.S. Cl. .......................... 313/32; 313/607; 362/218; 210/748.1
(58) Field of Classification Search ................ 313/607, 313/231.01, 22–24, 30, 32; 210/748.1; 362/218
See application file for complete search history.

(56) References Cited

U.S. PATENT DOCUMENTS

| 5,147,130 | A | * | 9/1992 | Watanuki ..................... 362/218 |
| 5,834,784 | A | * | 11/1998 | Morgan et al. .............. 250/436 |
| 6,294,869 | B1 | | 9/2001 | Adachi et al. |
| 6,379,024 | B1 | * | 4/2002 | Kogure et al. ................ 362/263 |
| 6,379,560 | B1 | * | 4/2002 | Tilp et al. ................. 210/748.1 |
| 6,525,472 | B2 | | 2/2003 | Okugi |
| 6,570,301 | B1 | * | 5/2003 | Hishinuma et al. .......... 313/607 |

FOREIGN PATENT DOCUMENTS

EP 0721204 A2 7/1996

(Continued)

*Primary Examiner*—Peter J Macchiarolo
*Assistant Examiner*—Christopher M Raabe

(57) ABSTRACT

A lamp holder for a dielectric barrier discharge (DBD) lamp (1), especially for use in a treatment system or reactor or housing or in an irradiation apparatus, for radiating a medium like a fluid and/or a gas and/or a solid material by means of the DBD lamp (1) is disclosed. The holder substantially comprises two end caps (21, 31) at the axial ends of the lamp (1) and an inner electrode (23, 24; 33, 34) with a screw fitting (SF) for exerting an axial pressure on both axial ends of the lamp (I) via both end caps (21, 31) and with axial bores (25, 35) into an inner volume (14) for guiding especially a cooling medium and for electrically contacting an inner tube (II) of the lamp (1). The holder has a comparatively simple construction and can easily be assembled. Furthermore, even larger tolerances of the lamp length can be compensated and a reliable sealing of the inner volume (14) against the outside of the lamp (1) is achieved.

11 Claims, 6 Drawing Sheets

FOREIGN PATENT DOCUMENTS

Figure 1:
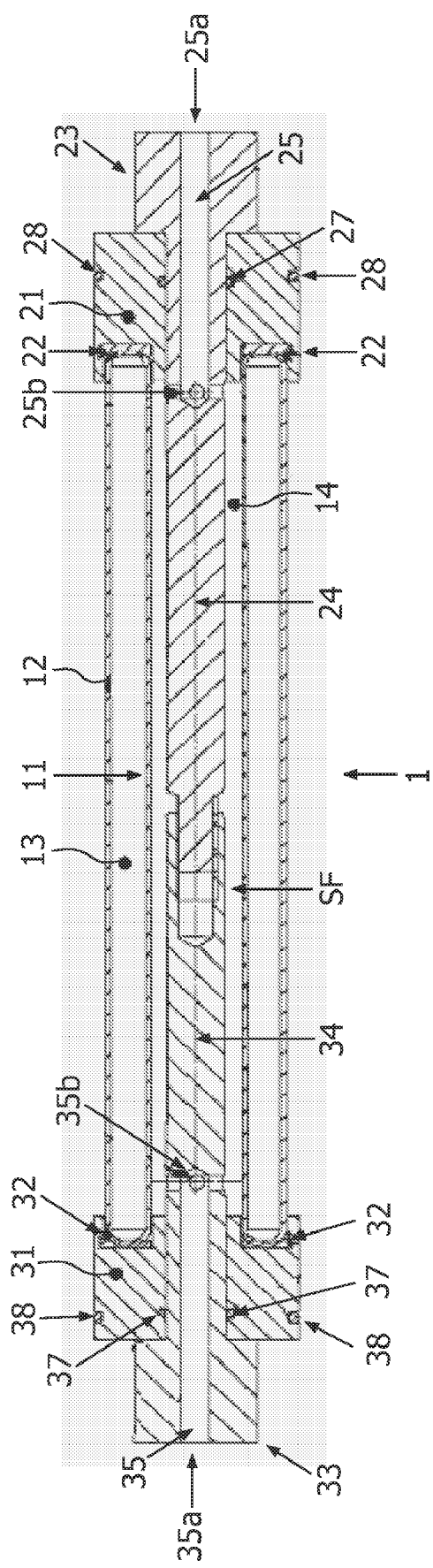

| | | |
|---|---|---|
| EP | 1041602 A2 | 10/2000 |
| EP | 1122765 A1 | 8/2001 |
| JP | 07288112 | 10/1995 |
| JP | 2003-068251 | 3/2003 |
| JP | 2003132849 | 5/2003 |
| JP | 2004-087270 | 3/2004 |

* cited by examiner

LAMP HOLDER FOR A DIELECTRIC BARRIER DISCHARGE LAMP

The invention relates to a lamp holder for a dielectric barrier discharge (DBD) lamp, especially for use in a treatment system or reactor or housing or in an irradiation apparatus, for radiating a medium like a fluid and/or a gas and/or a solid material by means of the DBD lamp.

As an alternative to conventional mercury based discharge lamps, dielectric barrier discharge lamps are of increasing importance especially as a source for generating high intensive and high power UV light within a narrow spectrum and with a high efficiency. The basic principle of these lamps is the generation of excimer radiation by means of a dielectric barrier discharge.

Typically, these lamps have a cylindrical, a dome shaped or a coaxial construction and they are cooled by means of an internal and/or an external flow of water. In case of a coaxial design the lamp usually comprises an inner and an outer quartz tube which are coaxially arranged to each other and are melted together on both their axial ends so that an annular discharge volume in the form of a gap is delimited between both.

A large number of UV applications like e.g. the treatment, activation and cleaning of surfaces, disinfection of fluids and gases, curing of lacquers, inks or paints, ozone generation etc. require highly intensive and high power UV sources preferably emitting in a narrow and well defined spectral range with a high radiation intensity.

In most cases the electrical energy is supplied to the discharge gas using capacitive coupling via electrodes which are applied on or close to the outer and/or inner lamp surfaces. Preferably two electrodes are used, namely an inner electrode which in case of a coaxial design is located inside the inner tube of the lamp, and an outer electrode which is connected to the outside of the lamp. The electrodes can be either implemented in the form of a direct electrical contact of the quartz tubes via a metallization, a metallic coating, a metallic grid or mesh or metallic stripes which are glued or painted onto the outside surface of the related quartz tube. As an alternative, the electrical contacting can be achieved via an intermediate liquid layer like for example a cooling medium or a medium to be treated which is in contact with the quartz tube. In this case electrodes preferably in the form of rods or coils are used which are in contact with the medium.

As the filling pressure of the discharge gas of high power dielectric barrier discharge lamps is typically in the range of several hundred mbar up to 1 bar, operation voltages of several kV are required. In order to keep the lamp temperature at an acceptable level, a flow of a liquid (e.g. water) or a gaseous (e.g. air, nitrogen) cooling medium is preferably fed through the inner tube of a coaxial lamp.

All these functions require a lamp holder which comprises special means for fixing the lamp and for sealing the inner circuit of the cooling medium against the medium to be treated. Furthermore, for supplying the cooling medium to the lamp and for electrically contacting the lamp, related feed-throughs have to be provided in the holder or housing. An irradiation apparatus comprising such a housing is disclosed e.g. in U.S. Pat. No. 6,294,869.

However, these and other holders or housings usually have several disadvantages. Generally, the above mentioned special functions require a plurality of components which are often connected with a complex and bulky construction of the holder or housing. Furthermore, most of these holders or housings are only suitable for one specific application of the lamp for which they are designed. Another disadvantage is that parts or components of the housing can shadow a significant part of the light emitted by the lamp at least towards one direction.

One object underlying the invention is to provide a lamp holder for a dielectric barrier discharge lamp which can be used in a very flexible way in a broad range of different applications.

Another object underlying the invention is to provide such a lamp holder which has a comparatively simple construction and which can be manufactured at comparatively low cost.

It is as well an object of the invention to provide such a lamp holder which is designed in such a way that the light emitted by the lamp is at least substantially not shadowed by any of the components of the holder.

At least one of these objects is solved according to claim 1 by a lamp holder especially for a dielectric barrier discharge lamp, comprising:

a first end cap for resting on a first axial end of the lamp and a second end cap for resting on a second axial end of the lamp and an electrode which extends between the first and the second end cap, wherein at least one axial end of the electrode is formed and extends through the adjacent end cap such that it rests in an axial direction on the end cap and comprises an at least substantially axial bore or hollow tube for axially feeding a medium into or out of an inner volume of the lamp, wherein the electrode further comprises a screw fitting being provided for exerting by tightening an axial pressure onto both axial ends of the lamp via the first and the second end cap.

One advantage of this solution is the fact that is has a considerably easier construction and can be assembled easier and faster in comparison to a conventional lamp holder as disclosed e.g. in U.S. Pat. No. 6,294,869 because only one screw fitting is necessary and has to be tightened for mounting and for exerting an axial pressure onto both axial ends of the lamp.

By appropriately tightening the screw fitting, an axial pressure can be exerted both between the electrode and both end caps, as well as between both end caps and the adjacent axial ends of the lamp, so that a reliable sealing of the inner volume of the lamp against its outside especially in case of a coaxial or cylindrical DBD lamp is ensured.

Furthermore, by accordingly dimensioning the screw fitting, even large geometrical tolerances which usually increase with increasing length of the DBD lamp can be compensated.

The subclaims disclose advantageous embodiments of the invention.

Claim 2 is directed on an embodiment comprising a very simple abutment between the electrode and the related end cap.

Claim 3 is directed on a preferred embodiment of a screw fitting in combination with an accordingly adapted electrode.

Claims 4 and 5 have the advantage, that all electrical and fluid connections can be made on one axial end of the holder so that the other axial end can be provided totally closed and electrically isolated.

Claim 6 has the advantages that the sealing of the inner volume of the lamp is further improved and that the active gas discharge within the discharge volume of the lamp can be delimited to a predetermined section of the discharge volume along the length of the lamp in order to prevent e.g. losses of radiated light due to shadowing at certain means of the holder.

Claims 7 to 9 are directed on advantageous positionings of sealings of the holder against the outside of the lamp.

Figure 2:
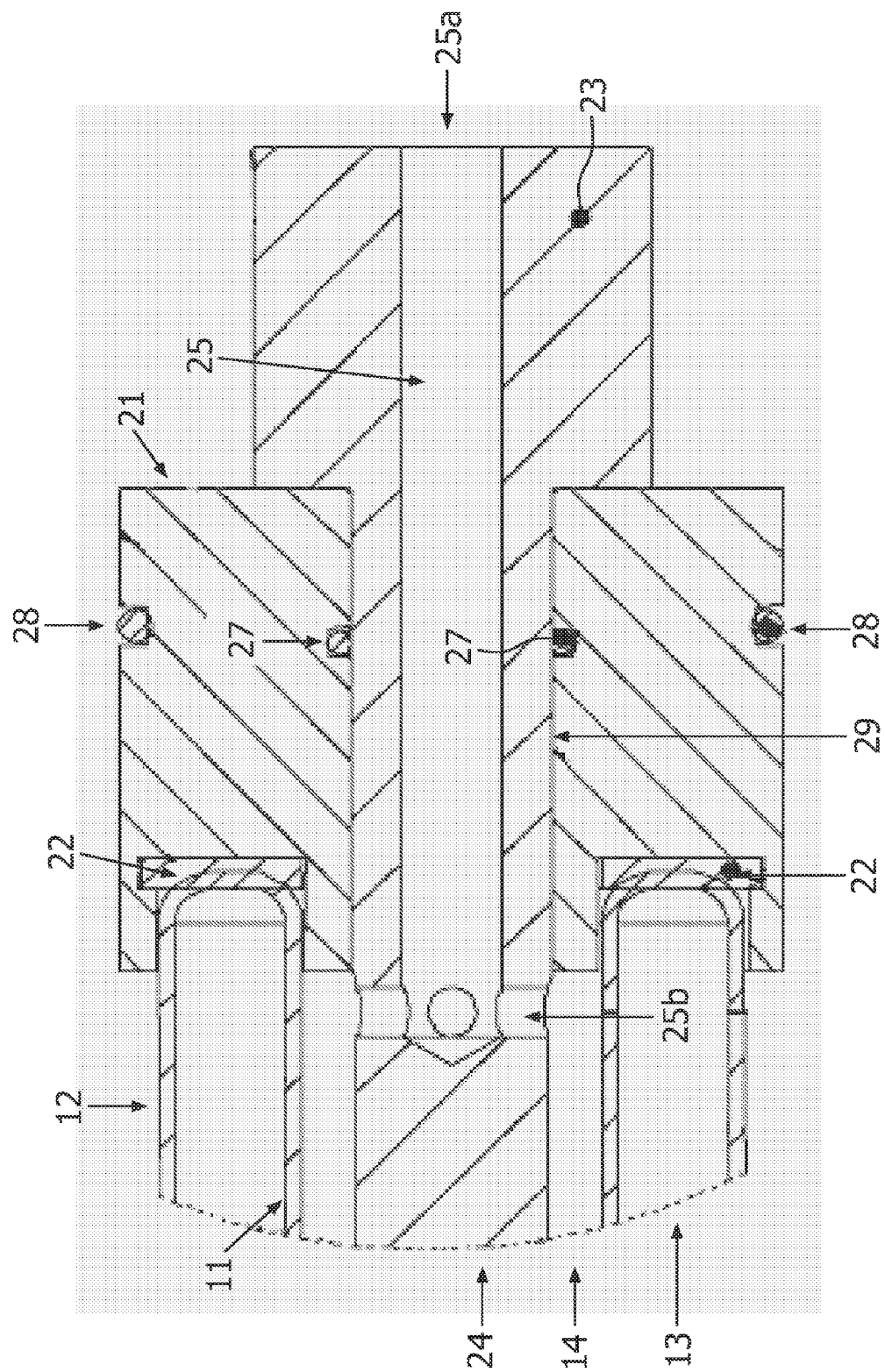
Figure 3:
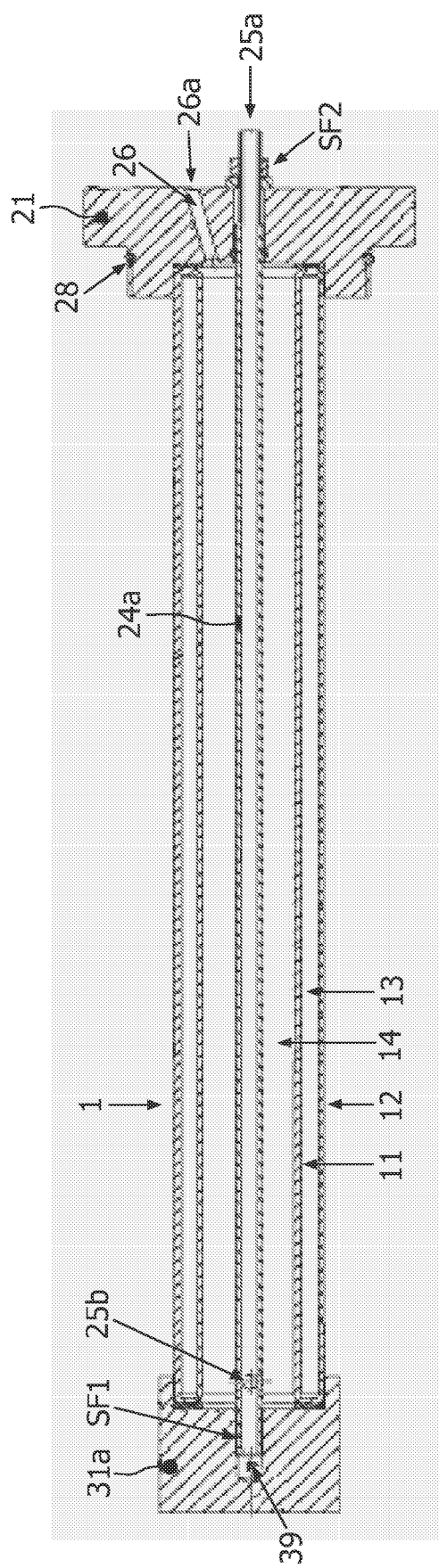
Figure 4:
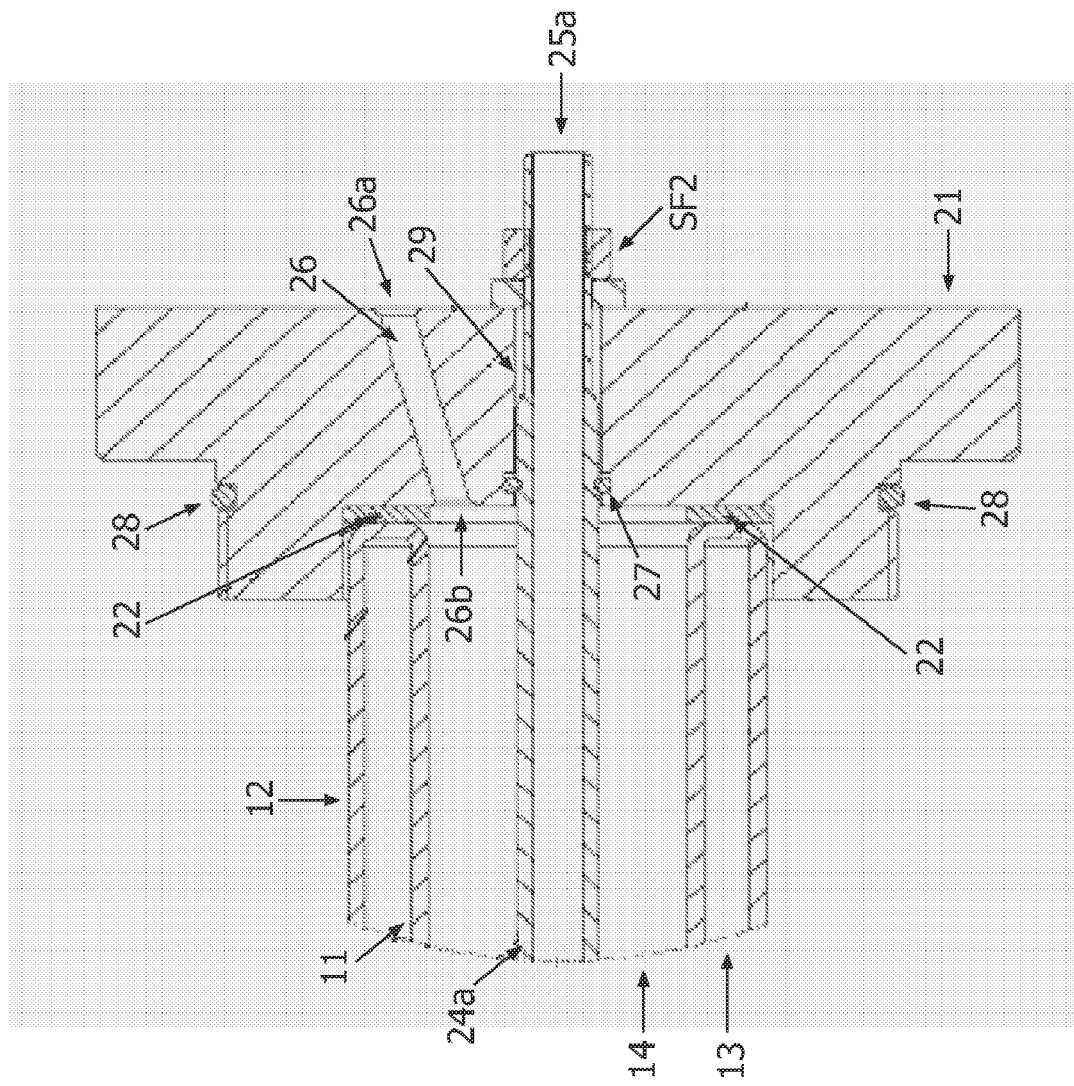
Figure 5:
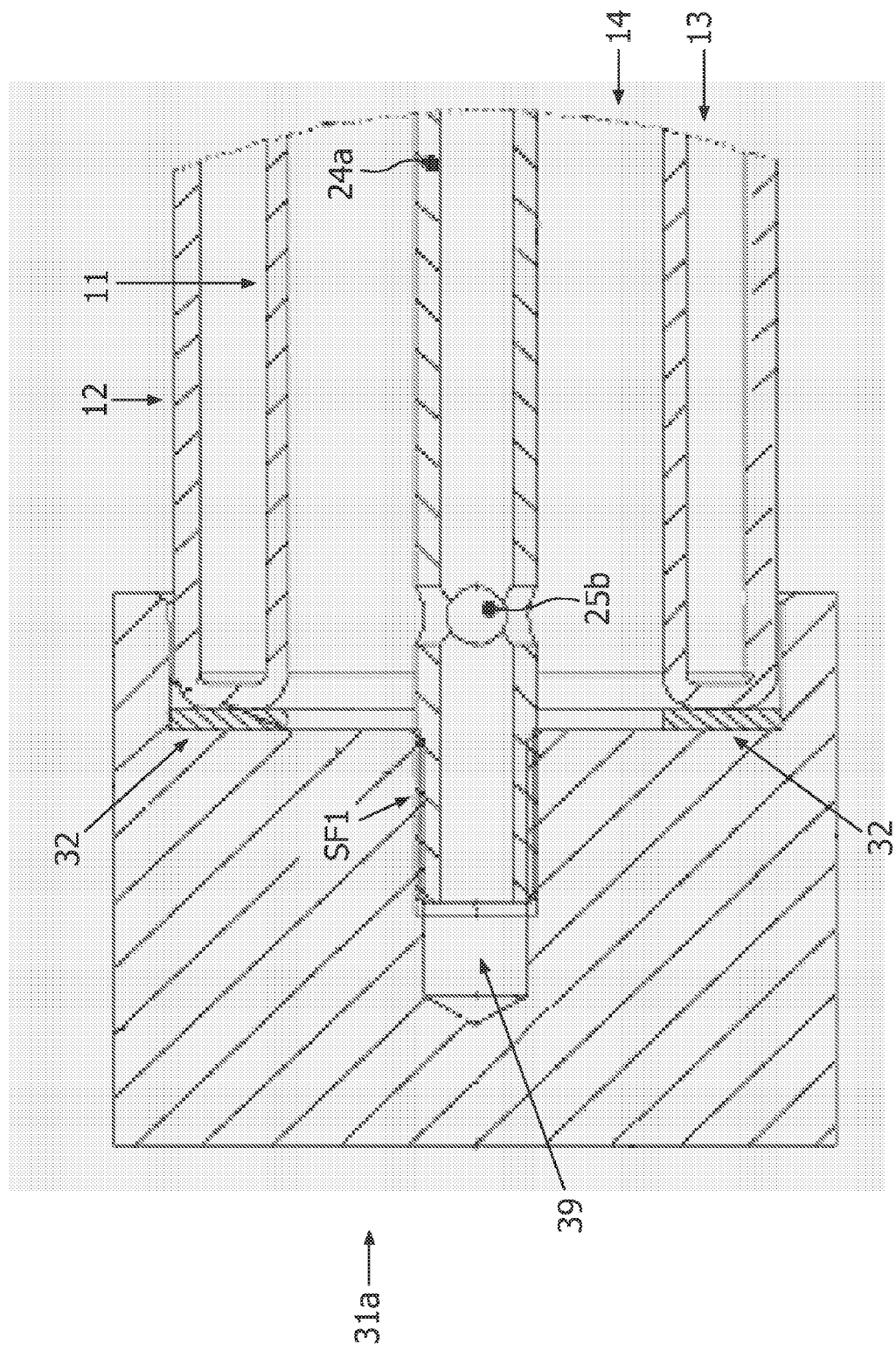
Figure 6:
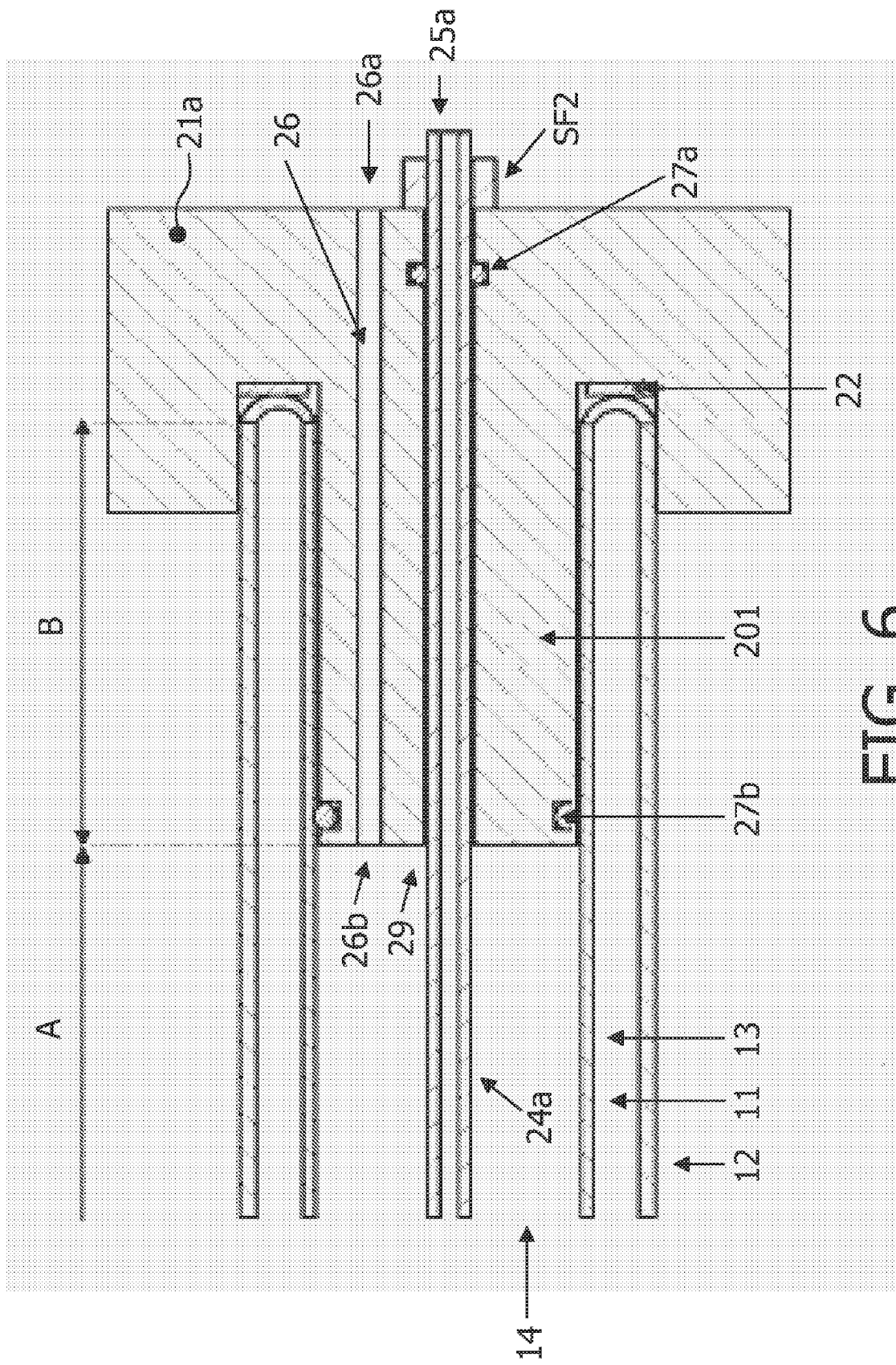

Further details, features and advantages of the invention are disclosed in the following specification of exemplary and preferred embodiments of the invention with reference to the drawings in which shows:

FIG. 1 a longitudinal cross section through a first embodiment of the invention;

FIG. 2 a detailed view of a longitudinal cross section through a part of FIG. 1;

FIG. 3 a longitudinal cross section through a second embodiment of the invention;

FIG. 4 a detailed view of a first part of FIG. 3 in a longitudinal cross section;

FIG. 5 a detailed view of a second part of FIG. 3 in a longitudinal cross section and FIG. 6 a detailed view of a part of a third embodiment of the invention in a longitudinal cross section.

FIG. 1 shows a longitudinal cross section through the main components of a lamp holder according to a first embodiment of the invention comprising a lamp 1 which is preferably a longitudinally extending dielectric barrier discharge (DBD) lamp 1.

The lamp holder can be a part of a treatment system or reactor or housing or of an irradiation apparatus for treating a medium like a fluid and/or a gas and/or a solid material by means of the radiation generated by the DBD lamp 1.

The lamp 1 comprises an inner quartz tube 11 and an outer quartz tube 12 which are arranged coaxially to each other. The tubes 11, 12 are melted to each other on both axial ends so that an annular discharge volume 13 is created between both.

In dependence on the proposed application, the discharge gas within the discharge volume 13 comprises a noble gas (e.g. xenon, argon or neon), a halogen (e.g. $F_2$, $J_2$, $Cl_2$), mercury (Hg) or mixtures of these substances. Furthermore, a special fluorescent coating can be applied on at least one of the tubes 11, 12 in order to convert the emitted radiation of the gas discharge into a radiation with another (especially a higher) wavelength.

In case of a liquid or gaseous medium to be treated, this medium preferably flows along the outside of the outer tube 12, whereas a liquid or gaseous cooling medium flows through an inner volume 14 of the lamp 1 which is enclosed by the inner tube 11. However, it is also possible to use the inner volume 14 for guiding the medium to be treated and let the cooling medium flow along the outside of the outer tube 12.

The lamp 1 is mounted by means of the holder which comprises a first end cap 21 resting in an axial direction on a first axial end of the lamp 1 and a second end cap 31 resting in an axial direction on a second axial end of the lamp 1. Furthermore, the holder comprises a multi-functional electrode which is formed with a first connecting part 23 at the first axial end of the lamp 1, a second connecting part 33 at the second axial end of the lamp 1 and a first and a second link 24, 34 between both parts 23, 33 wherein the links 24, 34 are connected to each other by means of a screw fitting SF.

FIG. 2 shows an enlarged and detailed view of one of the end caps 21 (31) and one of the connecting parts 23 (33) of the electrode which in this embodiment each are identical at both axial ends of the lamp 1.

The end caps 21, 31 have a substantially annular shape with an inner diameter and an outer diameter which are dimensioned such that the width of the end caps (in a direction perpendicular to the axis of the lamp 1) corresponds with the width of the annular gap between the inner and the outer tube 11, 12. By this, the faces of the axial ends of the lamp 1, i.e. the areas in which the inner and the outer tubes 11, 12 are connected to each other, can rest or abut in an axial direction on the end caps 21, 31. Between these faces and the related end cap 21, 31, each a first sealing ring 22, 32, respectively, is provided for sealing the inner volume 14 of the lamp 1 against the outside. Furthermore, the inner diameter of the end caps 21, 31 provides an electrical feed-through 29, 39 each in the form of a hole for inserting the connecting part 23, 33, respectively.

More in detail, the first connecting part 23 of the electrode extends with a first section of its length having a first diameter which is substantially equal to the inner diameter (feed-through 29) of the first end cap 21 through the same. A second section having a second diameter which is larger than the inner diameter of the first end cap 21 rests in the form of a radially extending shoulder on an outer face of the first end cap 21.

Correspondingly, the second connecting part 33 of the electrode extends with a first section of its length having a first diameter through the feed-through of the second end cap 31 so that the second section of the second connecting part 33 having a second larger diameter as well rests in the form of a radially extending shoulder on an outer face of the second end cap 31.

The first and the second connecting part 23, 33 is each provided with a feed and/or drain pipe in the form of an axial bore 25; 35 having a first opening 25a; 35a to the outside of the lamp 1 at one axial end of the bore. At the other end, a second opening 25b; 35b is provided each in the form of a hole which runs substantially radial and is positioned such that it connects the axial bore 25, 35 with the inner volume 14 of the lamp 1.

The first link 24 continues the first connecting part 23 and the second link 34 continues the second connecting part 33, each into the inner volume 14 of the lamp 1 where both links 24, 34 are connected to each other by means of the screw fitting SF.

In order to support or ensure a sealing of the inner volume 14 against the outside of the lamp 1, each a second sealing ring 27, 37 is provided between each end cap 21, 31 and the adjacent first and second connecting part 23, 33, respectively.

Furthermore, each an outer sealing ring 28, 38 is preferably provided between the outer circumference of the first and the second end cap 21, 31, respectively, and a wall of a treatment system or reactor or housing or an irradiation apparatus. These outer sealing rings 28, 38 serve to avoid any risk that a medium outside the outer surface of the lamp 1 can emerge from the system. By this, no sealing is required between the lamp 1 itself and such a wall.

For assembling the lamp 1 and the lamp holder 2, 3, the first and the second end caps 21, 31 are positioned each with the first sealing ring 22, 32, respectively, onto the axial ends of the lamp 1. Then, the first and the second connecting part 23, 33 is inserted with the first and second link 24, 34, respectively, into the feed-through 29, 39 of the related first and second end cap 21, 33, respectively, and into the inner volume 14 of the lamp 1. Finally, both links 24, 34 are screwed together by means of the screw fitting SF by turning the connecting parts 23, 33 against each other, until via the connecting parts 23, 33, the end caps 21, 31 and the first sealing rings 22, 32 a sufficiently high pressure is exerted in axial direction onto the axial ends of the lamp 1, so that the lamp 1 is fixed between both and the inner volume 14 is sealed against the outside of the lamp 1.

By this, an adaptation of the lamp holder 2, 3 to the length of the lamp 1 is achieved as well and tolerances of the length of the lamp 1 can be easily compensated.

One electrical contacting of the lamp 1 is realized by an electrically conductive fluid or gaseous medium which preferably is a cooling medium (or the medium to be treated) and which is fed through the axial bore 25, 35 and the hole 25b, 35b of one of the connecting parts 23, 33 into the inner volume 14 of the lamp 1 and drained out of this volume 14 through the hole 35b, 25b and the axial bore 35, 25 of the other connecting part 33, 23.

As an alternative and in case of a non-conductive medium which is fed through the inner volume 14 of the lamp 1, the inner surface of the inner tube 11 can be provided with an electrically conductive coating which is in contact with at least one of the connecting parts 23, 33 and/or at least one of the links 24, 34.

The other electrical contacting is realized via an electrically conductive fluid or gaseous medium which flows along the outside of the outer tube 12 of the lamp 1 and which preferably is the medium to be treated (or a cooling medium).

FIGS. 3 to 5 show a second embodiment of a lamp holder according to the invention. Similar or corresponding parts as in FIGS. 1 and 2 are denoted with the same reference signs, wherein substantially the differences in comparison to the first embodiment are explained in the following.

The holder comprises a first end cap 21 at one axial end of the lamp 1 and a second end cap 31a at the other axial end of the lamp 1. The first end cap 21 is shown in more details and in an enlarged view in FIG. 4, whereas the second end cap 31a is shown in more details and in an enlarged view in FIG. 5.

This holder is again provided for mounting a DBD lamp 1 comprising a first inner tube 11 and a second outer tube 12 which are melted together at their axial ends to form an annular discharge volume 13 as explained above with reference to FIG. 1.

Both end caps 21, 31a of the holder are again dimensioned such that the faces of the axial ends of the lamp 1, i.e. the areas in which the inner and the outer tubes 11, 12 are connected to each other, can rest or abut on the end caps 21, 31a. Between these faces and the adjacent end cap 21, 31a, each a first sealing ring 22, 32, respectively, is provided.

The first end cap 21 comprises an electrical feed-through in the form of a first through hole 29. Furthermore, the first end cap 21 comprises a second through hole 26 having a first opening 26a to the outside of the lamp 1. At the other end, a second opening 26b to the inner volume 14 of the lamp 1 is provided, so that a connection between the inner volume 14 of the lamp 1 and its outside is established.

According to FIG. 5, the second end cap 31a is provided with a threaded bore 39.

Furthermore, the holder comprises a multi-functional electrode having the form of a hollow tube 24a with a first opening 25a at a first axial end and a second opening 25b in the region of a second end.

This tube 24a extends with its first end through the first through hole 29 within the first end cap 21 (FIG. 4). The second end is provided with a thread SF1 at its outer surface which is screwed into the threaded bore 39 of the second end cap 31a (FIG. 5).

In order to fix the first end within the first hole 29, and to enable a variable pressure of both end caps 21, 31a against the axial ends of the lamp 1 and to achieve an adaptation to and a compensation of the length of the lamp 1, a counter nut SF2 is provided which is screwed onto a thread on the first end of the tube 24a and against the first end cap 21.

The second opening 25b of the tube 24a is provided in the form of a radial bore which connects the inner volume of the tube 24a with the inner volume 14 of the lamp 1.

For sealing the inner volume 14 of the lamp 1 against the outside, a second sealing ring 27 is provided between the tube 24a and the first end cap 21. Finally, an outer sealing ring 28 is as well provided as explained with reference to FIG. 2.

By this construction, preferably a cooling medium (or a medium to be treated) can enter the inner volume 14 of the lamp 1, e.g. through the tube 24a and the bore 25b at the end of the tube 24a and leave the volume 14 through the second through hole 26 within the first end cap 21 (or vice versa).

A main advantage of this embodiment is the fact that all connections for the electrode and the cooling medium can be made on one side of the lamp 1, whereas the other side is completely closed and can be electrically isolated. By this, the lamp 1 can be easily implemented into a flow system for example by simply submerging the other side into the medium within a treatment reactor.

FIG. 6 shows a first end cap 21a of a third embodiment of a lamp holder according to the invention. Similar or corresponding parts as in FIGS. 1 and 2 are denoted with the same reference signs wherein substantially the differences in comparison to the first and second embodiments are explained in the following.

The first end cap 21a is again dimensioned such that the faces of the axial ends of the lamp 1, i.e. the areas in which the inner and the outer tubes 11, 12 are connected to each other, can rest or abut axially on the end cap 21a. Between these faces and the first end cap 21a, a first sealing ring 22 is provided.

The first end cap 21a comprises an electrical feed through in the form of a first through hole 29. Furthermore, in a similar manner as in the first end cap of the second embodiment shown in FIG. 4, a second through hole 26 is provided in the end cap 21a which comprises a first opening 26a to the outside of the lamp 1. At the other end, a second opening 26b to the inner volume 14 of the lamp 1 is provided, so that again a connection between the inner volume 14 of the lamp 1 and its outside is established.

In contrary to the first and the second embodiment, this end cap 21a comprises an elongated portion 201 which extends into a section B of the inner volume 14 and which is formed in such a way that the medium within the volume 14 is at least substantially prevented to enter the section B.

The second end cap (not shown) is preferably provided as shown in FIG. 5, however, preferably comprising as well an elongated portion extending into the inner volume 14 of the lamp 1.

The inner electrode is again provided in the form of a hollow tube 24a having a first opening 25a at a first end and a second opening 25b as shown in FIG. 5 in the region of a second end.

The tube 24a again extends with its first end through the first through hole 29 within the first end cap 21a and is fixed by means of a counter nut against the first end cap 21a as shown in FIG. 4. The second end of the tube 24a is preferably provided according to FIG. 5 with a thread SF1 at its outer surface which is screwed into a threaded bore of the second end cap.

The second opening of the tube 24a is again preferably provided in the form of a bore which connects the inner volume of the tube 24a with the inner volume 14 of the lamp 1 as shown in FIG. 5, so that preferably a cooling medium (or a medium to be treated) can enter the inner volume 14 through the second through hole 26 and leave this volume 14 via the second opening in the tube 24a at the second end cap and through this tube 24a (or vice versa) as explained with reference to FIG. 3.

For sealing the inner volume 14 of the lamp 1 against the outside, a second sealing ring 27a is provided between the tube 24a and the first end cap 21. Furthermore, a third sealing ring 27b is provided between the inner axial end of the elongated portion 201 and the inner surface of the inner tube 11 of the lamp 1.

As mentioned above, the second end cap of this third embodiment of the lamp holder is preferably provided as indicated in FIG. 5 so that the second end of the tube 24a can be screwed into it. In order to exert an axial pressure onto the lamp 1 and to achieve a sealing and an adaptation and compensation of the lamp length, again a counter nut SF2 is screwed onto the first end of tube 24a and against the first end cap 21a.

Additionally to the advantages of the second embodiment, by the elongated portion 201 of this third embodiment, a direct contact between the medium within the inner volume 14 and the radially adjacent inner surface of the inner tube 11 is prevented in the section B.

This not only improves the sealing of the inner volume 14 against the outside of the lamp 1. In case that the electrical contacting of the lamp 1 is realized via the medium within the inner volume 14, the elongated portion 201 has the effect that in the discharge volume 13 which is radially adjacent to the elongated section 201 (i.e. in section B according to FIG. 6) at least substantially no gas discharge is ignited. Consequently, at least the main gas discharge is ignited only between the inner ends of the elongated portions 201 (corresponding with a section A of the discharge volume 13 in FIG. 6).

This has the advantage that the active volume A of the lamp 1 in which a gas discharge is generated can be determined even if the lamp 1 is operated submerged within a medium which is electrically conductive and which is in contact with the outer surface of the outer tube 12.

Preferably, the length of each elongated portion 201 is selected such that in those axial end sections B of the lamp 1 which are shadowed for example by the end caps or other means, no light is generated and consequently no loss of energy occurs due to such a shadowing.

Generally, such portions could as well be positioned with a desired length within the inner volume 14 between the end caps if they are provided with through holes for the medium flowing within the inner volume 14.

One of the advantages of all holders according to the invention is that geometrical tolerances of typical dielectric barrier discharge lamps can be compensated by the above described connection of the end caps. These tolerances increase with increasing length and diameter of the lamp, and they are mainly caused by the melting process. Usual tolerances for such lamps, which are in a range between about 0.5 mm and up to about several mm, cannot be compensated in a leakage-free system with most of the conventional holders.

Typical dielectric barrier discharge lamps for use with a holder according to the invention have a length between about 10 cm and about 1 m and a diameter between about 1 cm and about 10 cm.

The lamp holder according to the invention can be applied to any high power DBD lamp which preferably has a coaxial burner design and is cooled by means of an internal liquid or gas flow like for example an internal water flow through the inner volume 14. By means of the multi-functional holder a safe and reliable contacting of the inner lamp surfaces and a leakage free cooling water supply can be realized without the need for a bulky lamp housing.

Finally, the lamp holder according to the invention makes it possible to easily implement a liquid cooled DBD lamp in any flow or batch reactor system where a VUV or UVC radiation is used to treat a flowing medium, in particular if the medium is water and the outer lamp envelope is in direct contact with the water.

The invention claimed is:

1. A lamp holder for a submersible dielectric barrier discharge lamp having a first and a second axial end and defining an inner volume for guiding a cooling medium or a medium to be treated therethrough, the lamp holder comprising:
   a first and a second end caps for sealingly resting on the first and on the second axial end of the lamp, respectively; and
   an electrode axially extending between the first and second end cap and comprising:
      a first and a second connecting part axially extending through the first and the second end cap, respectively, wherein each connecting part defines a bore for feeding the medium into and out of the inner volume; and
      a first and a second link connected to the first and the second connecting part, respectively, and extending into the inner volume of the lamp, wherein both links are connectable with each other by means of a screw fitting for exerting, by tightening, an axial pressure onto the first and the second axial end of the lamp via the first and the second connecting part and the first and the second end cap.

2. The lamp holder according to claim 1, wherein at least one of the first and the second connecting parts comprise a radially extending shoulder resting on the first and the second end cap, respectively.

3. The lamp holder according to claim 1, wherein the axial bore has a first opening to the outside of the lamp at one axial end of the bore, and a second opening in the form of a radial hole connecting the axial bore with the inner volume of the lamp.

4. The lamp holder according to claim 1, wherein at least one of the first and second end caps comprises an elongated portion extending into a section of the inner volume and configured for preventing the medium from entering the section.

5. The lamp holder according to claim 1, wherein a first sealing ring is provided between the first and the second end cap, respectively, and the axial ends of a lamp.

6. The lamp holder according to claim 5, wherein a second sealing ring is provided between the first and the second end cap, respectively, and the electrode.

7. A lamp holder for a submersible dielectric barrier discharge lamp having a first and a second axial end and defining an inner volume for guiding a cooling medium or a medium to be treated therethrough, the lamp holder comprising:
   a first end cap for sealingly resting on the first axial end of the lamp, the first end cap defining a first and a second lumens for feeding the medium into and out of the inner volume;
   a second end cap for sealingly resting on the second axial end of the lamp, the second end cap defining a threaded bore; and
   an electrode comprising a hollow tube having a first opening at a first axial end and extending through the first lumen, wherein the second axial end comprises a screw fitting for screwing the tube into the threaded bore of the second end cap and defines a second opening to the inner volume of the lamp.

8. The lamp holder according to claim 7, wherein the first end of the electrode comprises a thread for screwing a counternut thereon and against the first end cap in order to exert by tightening an axial pressure onto the first and the second axial end of the lamp via the first and the second end cap.

9. The lamp holder according to claim 7, wherein at least one of the first and second end caps comprises an elongated portion extending into a section of the inner volume and configured for preventing the medium from entering the section.

10. The lamp holder according to claim 7, wherein a first sealing ring is provided between the first and the second end cap, respectively, and the axial ends of a lamp.

11. The lamp holder according to claim 10, wherein a second sealing ring is provided between the first and the second end cap, respectively, and the electrode.

* * * * *